US010379137B2

(12) United States Patent
Gafforelli et al.

(10) Patent No.: US 10,379,137 B2
(45) Date of Patent: Aug. 13, 2019

(54) ACCELEROMETER SENSE PATH SELF-TEST

(71) Applicant: PANASONIC CORPORATION, Osaka (JP)

(72) Inventors: Giacomo Gafforelli, Casatenovo (IT); Luca Coronato, Corsico (IT); Adolfo Giambastiani, San Marco (IT); Federico Mazzarella, Binasco (IT); Massimiliano Musazzi, Como (IT); Michele Folz, Pavia (IT)

(73) Assignee: PANASONIC CORPORATION, Osaka (JP)

( * ) Notice: Subject to any disclaimer, the term of this patent is extended or adjusted under 35 U.S.C. 154(b) by 151 days.

(21) Appl. No.: 15/363,404

(22) Filed: Nov. 29, 2016

(65) Prior Publication Data
US 2017/0168086 A1   Jun. 15, 2017

Related U.S. Application Data

(60) Provisional application No. 62/267,858, filed on Dec. 15, 2015.

(51) Int. Cl.
*G01P 21/00* (2006.01)
*G01P 15/125* (2006.01)

(52) U.S. Cl.
CPC ............ *G01P 21/00* (2013.01); *G01P 15/125* (2013.01)

(58) Field of Classification Search
CPC ............................... G01P 21/00; G01P 15/125
USPC ......................................................... 73/1.38
See application file for complete search history.

(56) References Cited

U.S. PATENT DOCUMENTS

| | | | |
|---|---|---|---|
| 6,067,858 A | 5/2000 | Clark et al. | |
| 8,646,308 B2 | 2/2014 | Mueck | |
| 2009/0241634 A1 | 10/2009 | Acar | |
| 2010/0145660 A1 | 6/2010 | Lang et al. | |
| 2010/0251800 A1 | 10/2010 | Mueck | |
| 2011/0016973 A1* | 1/2011 | Hamatani | G01P 15/125 73/514.29 |

(Continued)

FOREIGN PATENT DOCUMENTS

| | | | | |
|---|---|---|---|---|
| DE | 4414952 A1 | 11/1994 | | |
| DE | 112013006577 T5 * | 11/2015 | ......... | G01C 19/5726 |

*Primary Examiner* — Marrit Eyassu
(74) *Attorney, Agent, or Firm* — McDermott Will & Emery LLP

(57) ABSTRACT

A microelectromechanical (MEMS) accelerometer has a proof mass, a sense electrode, and an auxiliary electrode. The sense electrode is located relative to the proof mass such that a capacitance formed by the sense electrode and the proof mass changes in response to a linear acceleration along a sense axis of the accelerometer. The auxiliary electrode is located relative to the proof mass such that a capacitance formed by the auxiliary electrode and proof mass is static in response to the linear acceleration. A sense drive signal is applied at the sense electrode and an auxiliary drive signal is applied at the auxiliary electrode. The sense drive signal and the auxiliary drive signal have difference frequencies. A portion of a sensed signal at the sense drive frequency is used to determine linear acceleration while a portion of the sensed signal at the auxiliary drive frequency is used to identify damage within a sense path from the proof mass.

18 Claims, 8 Drawing Sheets

(56) References Cited

U.S. PATENT DOCUMENTS

| | | | |
|---|---|---|---|
| 2013/0104656 A1* | 5/2013 | Smith | G01P 15/125 |
| | | | 73/514.32 |
| 2013/0265070 A1 | 10/2013 | Kleks et al. | |
| 2013/0340524 A1* | 12/2013 | Maeda | G01P 15/0888 |
| | | | 73/514.02 |
| 2014/0182351 A1 | 7/2014 | Miller et al. | |
| 2014/0250969 A1 | 9/2014 | Alagarsamy et al. | |
| 2014/0250971 A1* | 9/2014 | Fang | G01P 15/125 |
| | | | 73/1.37 |
| 2015/0355218 A1* | 12/2015 | Jeong | G01P 15/125 |
| | | | 73/504.12 |
| 2016/0011254 A1* | 1/2016 | Maeda | G01C 19/5726 |
| | | | 324/538 |

* cited by examiner

# ACCELEROMETER SENSE PATH SELF-TEST

CROSS REFERENCE TO OTHER APPLICATIONS

This application claims priority to U.S. Provisional Patent Application No. 62/267,858 entitled "Accel Series Resistance to PM Detector," filed Dec. 15, 2015, which is incorporated herein by reference for all purposes.

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

Motion sensors such as accelerometers and gyroscopes may be manufactured as microelectromechanical (MEMS) sensors that are fabricated using semiconductor manufacturing techniques. A MEMS sensor may include movable proof masses that can respond to forces such as linear acceleration (e.g., for MEMS accelerometers) and angular velocity (e.g., for MEMS gyroscopes). The operation of these forces on the movable proof masses may be measured based on the movement of the proof masses in response to the forces. In some implementations, this movement is measured based on distance between the movable proof masses and sense electrodes, which form capacitors for sensing the movement. The sense electrodes of a MEMS accelerometer may receive a signal at a drive frequency, which results in motion of the proof mass relative to the sense electrodes as a result of linear acceleration. In some implementations, the voltage of the proof mass may be measured in order to sense the movement in response to linear acceleration. A resistance within the sense path for the proof mass voltage may be indicative of damage to one or more components of the accelerometer, and may result in errors in the measurement of linear acceleration.

SUMMARY OF THE INVENTION

In an exemplary embodiment in accordance with the present disclosure, a system comprises at least two sense electrodes, wherein a sense drive signal having a sense drive frequency is applied to each of the sense electrodes, a first auxiliary electrode, wherein a first auxiliary drive signal having an auxiliary drive frequency is applied to the first auxiliary electrode, and a second auxiliary electrode, wherein a second auxiliary drive signal having the auxiliary drive frequency is applied to the second auxiliary electrode. The system further comprises a first proof mass, wherein the first proof mass is located adjacent to one or more of the at least two sense electrodes and adjacent to the first auxiliary electrode, and a second proof mass, wherein the second proof mass is located adjacent to one or more of the at least two sense electrodes and adjacent to the second auxiliary electrode. The system further comprises processing circuitry coupled to each of the first proof mass and the second proof mass to provide a received signal from the first proof mass and the second proof mass, wherein the processing circuitry determines linear acceleration based on a portion of the received signal associated with the sense drive frequency, and identifies a failure based on a portion of the received signal associated with the auxiliary drive frequency.

An exemplary method in accordance with the present disclosure comprises providing, to at least two sense electrodes, a sense drive signal having a sense drive frequency, providing, to a first auxiliary electrode, a first auxiliary drive signal having an auxiliary drive frequency, and providing, to a second auxiliary electrode, a second auxiliary drive signal having the auxiliary drive frequency. The exemplary method further comprises receiving, from a first proof mass located adjacent to one or more of the at least two sense electrodes and adjacent to the first auxiliary electrode, a first proof mass signal, receiving, from a second proof mass located adjacent to one or more of the at least two sense electrodes and adjacent to the second auxiliary electrode, a second proof mass signal, and generating a received signal based on the first proof mass signal and the second proof mass signal. The exemplary method further comprises determining linear acceleration based on a portion of the received signal associated with the sense drive frequency and identifying a failure based on a portion of the received signal associated with the auxiliary drive frequency.

In an exemplary embodiment in accordance with the present disclosure, a suspended spring-mass system comprises a proof mass suspended by one or more springs to move in response to a linear acceleration along a first axis, a sense electrode located adjacent to the proof mass such that a capacitor formed by the proof mass and the sense electrode changes in response to the linear acceleration along the first axis, and an auxiliary electrode located adjacent to the proof mass such that a capacitor formed by the proof mass and the auxiliary electrode does not change in response to the linear acceleration along the first axis. The exemplary suspended spring-mass system further comprises processing circuitry coupled to each of the proof mass, the sense electrode, and the drive electrode, wherein the processing circuitry provides a sense drive signal having a sense drive frequency to the sense electrode and an auxiliary drive signal having an auxiliary drive signal to the auxiliary electrode, and wherein the processing circuitry receives a received signal from the proof mass, determines linear acceleration based on a portion of the received signal associated with the sense drive frequency, and identifies a failure based on a portion of the received signal associated with the auxiliary drive frequency.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
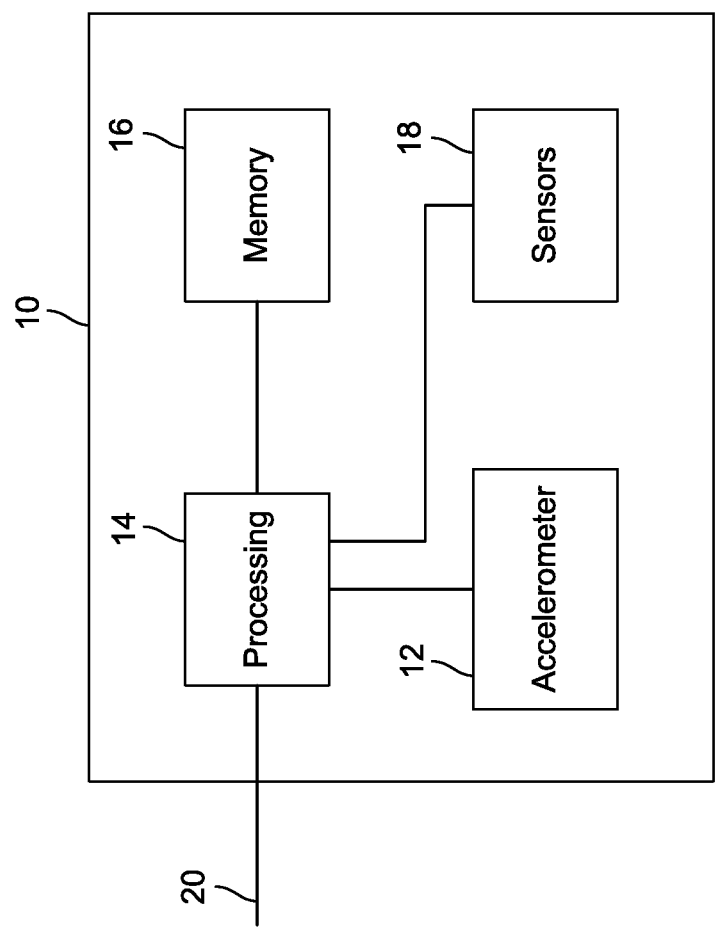
FIG. 1 shows an illustrative motion sensing system in accordance with an embodiment of the present disclosure.

An accelerometer is designed and manufactured as a microelectromechanical (MEMS) accelerometer. A MEMS layer is formed using semiconductor processing techniques to include the mechanical components of the sensor and electrical connections to other components of the MEMS accelerometer, such as CMOS circuitry located within the sensor die (e.g., a CMOS layer that also functions as a substrate or cap layer) or external to the sensor die. The MEMS layer is hermetically sealed within other semiconductor layers, such as an underlying substrate layer and a cap layer.

The MEMS layer includes a suspended spring-mass system in which one or more proof masses are suspended within the MEMS layers by springs, and the movement of the proof masses is restricted by the springs, and in some embodiments, additional components such as masses and levers. These springs and additional components collectively allow motion of the proof masses along certain axes (e.g., one or more axes for measurement of linear acceleration) while restricting motion along other axes such that there is substantially little movement of the proof masses along these other axes in response to external forces (i.e., the proof mass is static along these other axes).

Fixed sense electrodes are located adjacent to each proof mass in the direction of the sensed linear acceleration. Each proof mass and its adjacent sense electrodes form a capacitor, the capacitance of which changes based on the distance between the proof mass and the sense electrodes. This distance in turn changes as the suspended proof mass moves relative to the fixed sense electrodes in response to the linear acceleration. A sense drive signal is applied to the sense electrodes at a sense drive frequency, such that the magnitude of a signal at that sense drive frequency changes based on the motion of the capacitively coupled proof mass in response to linear acceleration. The change in capacitance is sensed by sense circuitry which may be coupled to a component of the capacitor such as the proof mass or a sense electrode, and linear acceleration is determined based on the output of the sense circuitry.

Auxiliary electrodes may also be located adjacent to the proof mass, in order to form a capacitor with the proof mass. Although in some embodiments the auxiliary electrode may be located in other locations with respect to the proof mass, in an embodiment the auxiliary electrodes may be located adjacent to the proof mass in a direction in which the proof mass is static in response to external forces (e.g., based on the configuration of the suspended spring-mass system). In an embodiment the auxiliary electrodes can be in the same plane of the proof mass forming an in-plane capacitance, in other embodiments these can be in a parallel plane to the proof mass plane forming an out-of-plane capacitance.

An auxiliary drive signal may be provided to the auxiliary electrode and via the capacitor formed thereby, to the adjacent proof mass. The auxiliary drive signal may be at a different frequency than the sense drive signal, and in some embodiments, the frequencies may be selected such that a first few harmonics of the two signals do not overlap. For example, the auxiliary drive signal may have a frequency equal to the frequency of the sense drive signal multiplied by 32 and divided by 21. Because the auxiliary electrodes and proof mass are static with respect to each other, a portion of a sensed signal received by the sense circuitry at the auxiliary drive signal may be substantially constant under normal operating conditions. However, if damage occurs in the sense path (e.g., the proof mass, components of the suspended mass system, and other electrical connections to the sense circuitry), the magnitude of the signal at the auxiliary drive frequency will decrease in proportion to a resistance created by the damage. Once this signal magnitude falls below a threshold (e.g., indicating a resistance above a threshold), an error may be determined, and in some embodiments, compensation may be performed to allow the accelerometer to continue to operate in spite of the error.

FIG. 1 depicts an exemplary motion sensing system 10 in accordance with some embodiments of the present disclosure. Although particular components are depicted in FIG. 1, it will be understood that any suitable combination of sensors, processing components, memory, and other circuitry may be utilized as necessary for different applications and systems. In an embodiment as described herein, the motion sensing system may include at least a MEMS accelerometer 12 and supporting circuitry, such as processing circuitry 14 and memory 16. In some embodiments, one or more additional sensors 18 (e.g., additional MEMS gyroscopes, MEMS accelerometers, MEMS microphones, MEMS pressure sensors, and a compass) may be included within the motion processing system 10 to provide an integrated motion processing unit ("MPU") (e.g., including 3 axes of MEMS gyroscope sensing, 3 axes of MEMS accelerometer sensing, microphone, pressure sensor, and compass).

Processing circuitry 14 may include one or more components providing necessary processing based on the requirements of the motion processing system 10. In some embodiments, processing circuitry 14 may include hardware control logic that may be integrated within a chip of a sensor (e.g., on a substrate or cap of an accelerometer 12 or other sensor 18, or on an adjacent portion of a chip to the accelerometer 12 or other sensor 18) to control the operation of the accelerometer 12 or other sensors 18 and perform aspects of processing for the accelerometer 12 or other sensors 18. In some embodiments, the accelerometer 12 and other sensors 18 may include one or more registers that allow aspects of the operation of hardware control logic to be modified (e.g., by modifying a value of a register). In some embodiments, processing circuitry 14 may also include a processor such as a microprocessor that executes software instructions, e.g., that are stored in memory 16. The microprocessor may control the operation of the accelerometer 12 by interacting with the hardware control logic, and process measurement signals received from accelerometer 12. The microprocessor may interact with other sensors 18 in a similar manner.

Although in some embodiments (not depicted in FIG. 1), the accelerometer 12 or other sensors 18 may communicate directly with external circuitry (e.g., via a serial bus or direct connection to sensor outputs and control inputs), in an embodiment the processing circuitry 14 may process data received from the accelerometer 12 and other sensors 18 and communicate with external components via a communication interface 20 (e.g., a SPI or I2C bus, or in automotive applications, a controller area network (CAN) or Local Interconnect Network (LIN) bus). The processing circuitry 14 may convert signals received from the accelerometer 12 and other sensors 18 into appropriate measurement units (e.g., based on settings provided by other computing units communicating over the communication bus 20) and perform more complex processing to determine measurements such as orientation or Euler angles, and in some embodiments, to determine from sensor data whether a particular activity (e.g., walking, running, braking, skidding, rolling, etc.) is taking place.

In some embodiments, certain types of information may be determined based on data from multiple accelerometers 12 and sensors 18, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

An exemplary MEMS accelerometer (e.g., accelerometer 12) may include one or more movable proof masses that are configured in a manner that permits the MEMS accelerometer to measure linear acceleration along an axis. In some embodiments, the one or more movable proof masses may be suspended from anchoring points, which may refer to any portion of the MEMS sensor which is fixed, such as an anchor that extends from a layer (e.g., a CMOS layer) that is parallel to the MEMS layer of the device, a frame of the MEMS layer of the device, or any other suitable portion of the MEMS device that is fixed relative to the movable proof masses. The proof masses may be arranged in a manner such that they move in response to linear acceleration. The movement of the proof masses relative to a fixed surface (e.g., a fixed electrode) in response to linear acceleration is measured and scaled to determine linear acceleration or some other motion parameter.

An exemplary MEMS accelerometer may have proof masses that are suspended in a manner such that they are relatively unlikely to move along certain axes (e.g., perpendicular to the axis along which linear acceleration is measured), for example, based on springs or other couplings that are relatively rigid along these certain axes, such that the proof mass is static along these certain axes. In an embodiment as described herein, one or more auxiliary electrodes may be located adjacent to the proof mass the direction of this static axis, and an auxiliary drive signal having an auxiliary drive signal may be provided to the proof mass via the auxiliary electrode, based on the capacitor formed therebetween. As is described herein, this signal may be used to identify errors such as possible damage to one or more components of the accelerometer and a sense path of the accelerometer. This auxiliary drive signal may have a frequency that differs from a sense drive signal applied to the sense electrodes, such that an initial number of harmonics of the two signals are not overlapping. In this manner, information at both the auxiliary drive frequency and a sense drive frequency may be assessed independently by sense circuitry of the processing circuitry 14. Based on measurement of a signal at the auxiliary drive frequency (e.g., including harmonics thereof), an error may be identified, compensation may be performed, a failure may be identified, and/or notifications may be provided to other components, devices, and circuitry (e.g., via communication interface 20).

Figure 2:
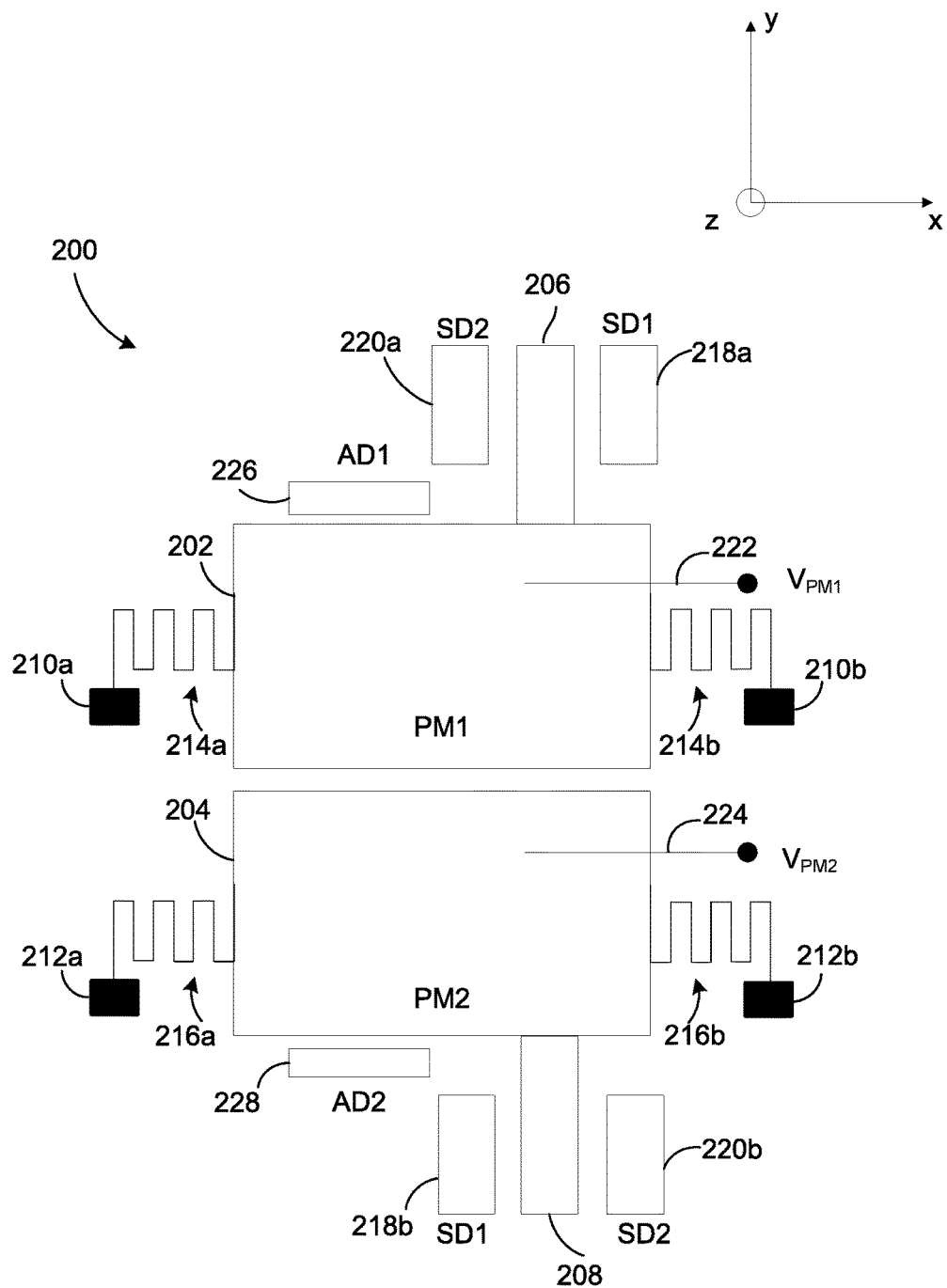
FIG. 2 shows an illustrative accelerometer including auxiliary electrodes that provide an auxiliary drive signal at an auxiliary drive frequency, in accordance with some embodiments of the present disclosure.

FIG. 2 depicts an illustrative accelerometer including auxiliary electrodes in accordance with some embodiments of the present disclosure. As depicted in FIG. 2, an exemplary accelerometer comprises a suspended spring mass system, a plurality of sense electrodes, and a plurality of auxiliary electrodes. Although an exemplary accelerometer 200 is depicted as including particular components in FIG. 2, it will be understood that the present disclosure may be implemented with a plurality of accelerometer designs including any suitable number and configuration of proof masses, springs, coupling masses, levers, coupling arms, electrodes, and other suitable components that enable the sensing of linear acceleration in one or more directions.

In an embodiment, the accelerometer includes proof mass 202 and proof mass 204 in a MEMS layer of the accelerometer, which are suspended from a plurality of anchors 210$a$/210$b$ and 212$a$/212$b$ via respective springs 214$a$/214$b$ and 216$a$/216$b$. The exemplary anchors 210 $a$/210 $b$ and 212$a$/212$b$ extend from a substrate (e.g., located below the MEMS layer in the negative z-direction) into the MEMS layer, such that the springs 214$a$/214$b$ and 216$a$/216$b$ within the MEMS layer facilitate the suspension of the proof masses 202 and 204. In an embodiment, springs 214$a$/214$b$ and 216$a$/216$b$ are folded springs that are constructed and located such that they are compliant along a first axis within the MEMS plane of the accelerometer 200 and rigid along a second axis within the MEMS plane. In the exemplary embodiment of FIG. 2, the accelerometer 200 may sense linear acceleration along the x-axis, and the springs 214$a$/214$b$ and 216$a$/216$b$ may be compliant along the x-axis and rigid along the y-axis.

The accelerometer may include components to sense the movement of the proof masses 202 and 204 in response to linear acceleration, which may include any suitable sensing mechanisms such as optical sensing, piezoelectric sensing, capacitive sensing, or any other suitable sensing techniques. In an embodiment, sensing may be performed based on the movement of the proof masses 202 and 204 with respect to fixed sense electrodes. Although depicted as forming capacitive plates in FIG. 2, in embodiments the proof masses and sense electrodes may include other suitable sensing components such as drive combs form a capacitor having a capacitance that varies based on the distance between a respective proof mass and fixed sense electrode.

In an embodiment, a first proof mass arm 206 may extend from proof mass 202 in the positive y-direction and a second proof mass arm 208 may extend from proof mass 204 in the negative y-direction, such that the each of the proof mass arms may form an exposed surface (e.g., having the depth of the MEMS layer in the z-direction) facing in the direction of the axis along which linear acceleration is being sensed (e.g., facing in each of the positive x-direction and negative x-direction). As depicted in FIG. 2, in an exemplary embodiment each of a plurality of sense electrodes may be located adjacent to the proof mass arms 206/208 of the proof masses 202/204. In the context of the present disclosure, it will be understood that a description of an electrode or similar sensing component as "adjacent" to a proof mass includes a proof mass or any components thereof, or any other components that move proportionally and in unison with the proof mass.

In the embodiment of FIG. 2, each of sense electrodes 218a, 218b, 220a, and 220b extend from the substrate into the MEMS layer, such that each proof mass includes a surface that faces a plane of one of the proof mass arms 206/208 along the axis of sensed linear acceleration of the accelerometer (e.g., a surface of sense electrode 220a facing a surface of proof mass 206 in the positive x-direction, a surface of sense electrode 218a facing a surface of proof mass 206 in the negative x-direction, a surface of sense electrode 218b facing a surface of proof mass 208 in the positive x-direction, and a surface of sense electrode 220b facing a surface of proof mass 208 in the negative x-direction). In this manner, sense electrodes 220a and 218a each form a capacitor with proof mass arm 206 that changes capacitance based on the movement of the proof mass arm 206 relative to the fixed sense electrodes 220a/218a, while sense electrodes 218b and 220b each form a capacitor with proof mass arm 208 that changes capacitance based on the movement of the proof mass are 208 relative to the fixed sense electrodes 218b/220b.

In some embodiments, a periodic signal may be applied to sense electrodes and/or proof masses in order to sense a linear acceleration along the sensing axis. The periodic signal may be a sense drive signal that is applied and is sensed as having a substantially constant magnitude when the proof mass is not moving (i.e., when there is no linear acceleration). In response to a linear acceleration along the sensing axis the proof mass may move, such that the magnitude of the oscillation relative to the fixed sense electrodes changes in a manner that is proportional to the magnitude of the linear acceleration.

In an embodiment of the exemplary accelerometer of FIG. 2, a differential sense drive signal may applied to the respective sense electrodes for a particular proof mass, although it will be understood that in some embodiments a common mode drive signal may be utilized. As is depicted in FIG. 2, a label SD1 is associated with each of sense electrodes 218a and 218b and a label SD2 is associated with each of sense electrodes 220a and 220b. In an embodiment, each of the labels correspond to differential sense drive signals SD1 and SD2 having a common sense drive frequency but being 180 degrees out of phase. In this manner, the first sense drive signal SD1 is applied to proof mass 202 via the capacitor formed by sense electrode 218a and proof mass arm 206, the second sense drive signal SD2 is applied to proof mass 202 via the capacitor formed by sense electrode 220a and proof mass arm 206, the first sense drive signal SD1 is applied to proof mass 204 via the capacitor formed by sense electrode 218b and proof mass arm 208, and the second sense drive signal SD2 is applied to proof mass 204 via the capacitor formed by sense electrode 220b and proof mass arm 208. In the exemplary embodiment of FIG. 2, this configuration and application of sense drive signals may result in the proof masses 202 and 204 moving in response to a linear acceleration along the sense axis, such that the relative position and capacitance between proof mass 202 and sense electrode 218a is equal to the relative position and capacitance between proof mass 204 and sense electrode 218b, and such that the relative position and capacitance between proof mass 202 and sense electrode 220a is equal to the relative position and capacitance between proof mass 204 and sense electrode 220b.

Although it will be understood that the response of the proof masses to a linear acceleration may be based on a variety of suitable measurement techniques from a variety of sense mechanisms (e.g., measurement of signals from sense electrodes, etc.), in an embodiment, the movement of the proof mass relative to the sense electrodes may be measured based on the voltages $V_{PM1}$ and $V_{PM2}$ from proof mass 202 (PM1) and proof mass 204 (PM2), respectively. The voltages may be measured via a sense path 222 for proof mass 202 and sense path 224 for proof mass 224. Although the sense path is depicted as a direct connection in FIG. 2, it will be understood that a sense path may include any suitable components or combination thereof that form an electrical path between the component being sensed (e.g., proof masses 202 and 204) and sensing circuitry that generate a signal responsive to the movement of the proof mass relative to the sense electrodes. In exemplary embodiments, a sense path may include one or more components within the MEMS layer (e.g., proof masses, springs, coupling masses, levers, etc.), other layers of the MEMS die (e.g., anchors, electrical traces, wires, etc.) and other components coupled to the accelerometer die (e.g., wires or leads connected to external sensing circuitry).

In some embodiments, one or more auxiliary electrodes may also be located adjacent to a proof mass (i.e., to the proof mass, components thereof, or connected components that move in unison therewith) in a manner to form one or more additional capacitors with the proof mass. The auxiliary electrodes may be located adjacent to portion of the proof mass that is static in response to linear acceleration along the sensed axis, e.g., based on the configuration of one or more springs or other components that restrict movement of the proof mass in the direction of the auxiliary electrodes. The auxiliary electrodes may be fixed (e.g., anchored to a substrate of a CMOS layer) such that a capacitance between an auxiliary electrodes and a proof mass does not change in response to a linear acceleration along the sensing axis.

In the exemplary embodiment of the accelerometer 200 of FIG. 2, an auxiliary electrode 226 may be located adjacent to proof mass 202, such that each has a facing surface in the y-direction along the z-direction depth of the MEMS layer (e.g., with auxiliary electrode 226 having a capacitor face oriented in the negative y-direction and proof mass 202 having a capacitor face oriented in the positive y-direction). An auxiliary electrode 228 may be located adjacent to proof mass 204, such that each has a facing surface in the y-direction along the z-direction depth of the MEMS layer (e.g., with auxiliary electrode 228 having a capacitor face oriented in the positive y-direction and proof mass 204 having a capacitor face oriented in the negative y-direction).

The auxiliary electrodes may apply an auxiliary drive signal to the proof mass, which may be utilized to identify errors (e.g., physical damage) within a sense path. Errors within a sense path may impact the accuracy of accelerometer in measuring movement along the sense axis, e.g., as a resistance associated with the error/damage changes a signal that is sensed based on the sense drive signal. In an embodiment, the auxiliary drive signal may have an auxiliary drive frequency, which may be selected to be a frequency that differs from the sense drive frequency. In some embodiments, the auxiliary drive frequency may be selected such that an initial set of initial harmonics for each of the signals will not overlap (e.g., such that the auxiliary drive frequency is equal to 32/21 of the sense drive frequency). However, other relative frequency values may be utilized, such that the auxiliary drive signal is greater than or less than the sense drive frequency, including by an order of magnitude or more.

As is described herein, the error in the sense path may be identified and quantified based on measurements of the auxiliary drive signal through the sense path, either alone or in combination with measurements of the sense drive signal. Because a sensed auxiliary drive signal should remain relatively unchanged during operation, changes in the magnitude of the signal (e.g., decreases or increases exceeding one or more thresholds) may be indicative of an error, and in some embodiments, the severity of the error. In some embodiments where an error is identified, compensation may be performed at the accelerometer based on the severity by modifying operating parameters such as scaling factors, voltages of sense drive signals, a signal path gain, or other suitable operating parameters. In some embodiments, measurements of the sense drive signal may also be considered along with the auxiliary drive signal to identify errors or severity, or to control compensation. For example, patterns may be identified based on changes in the sense drive signal in response to acceleration over time and correlated to changes in the auxiliary drive signal.

Although an auxiliary drive signal may be applied in a variety of suitable manners (e.g., common mode, multiple auxiliary electrodes per proof mass, etc.), in an embodiment as depicted in FIG. 2, a single auxiliary electrode may be located adjacent to each proof mass, and the drive electrodes may apply differential signals AD1 and AD2 to their respective proof masses (e.g., such that an auxiliary drive signal AD1 is applied to proof mass 202 via auxiliary electrode 226 and such that an auxiliary drive signal AD2 is applied to proof mass 204 via auxiliary electrode 228, with the auxiliary drive signal AD1 and auxiliary drive signal AD2 being differential signals).

Figure 3:
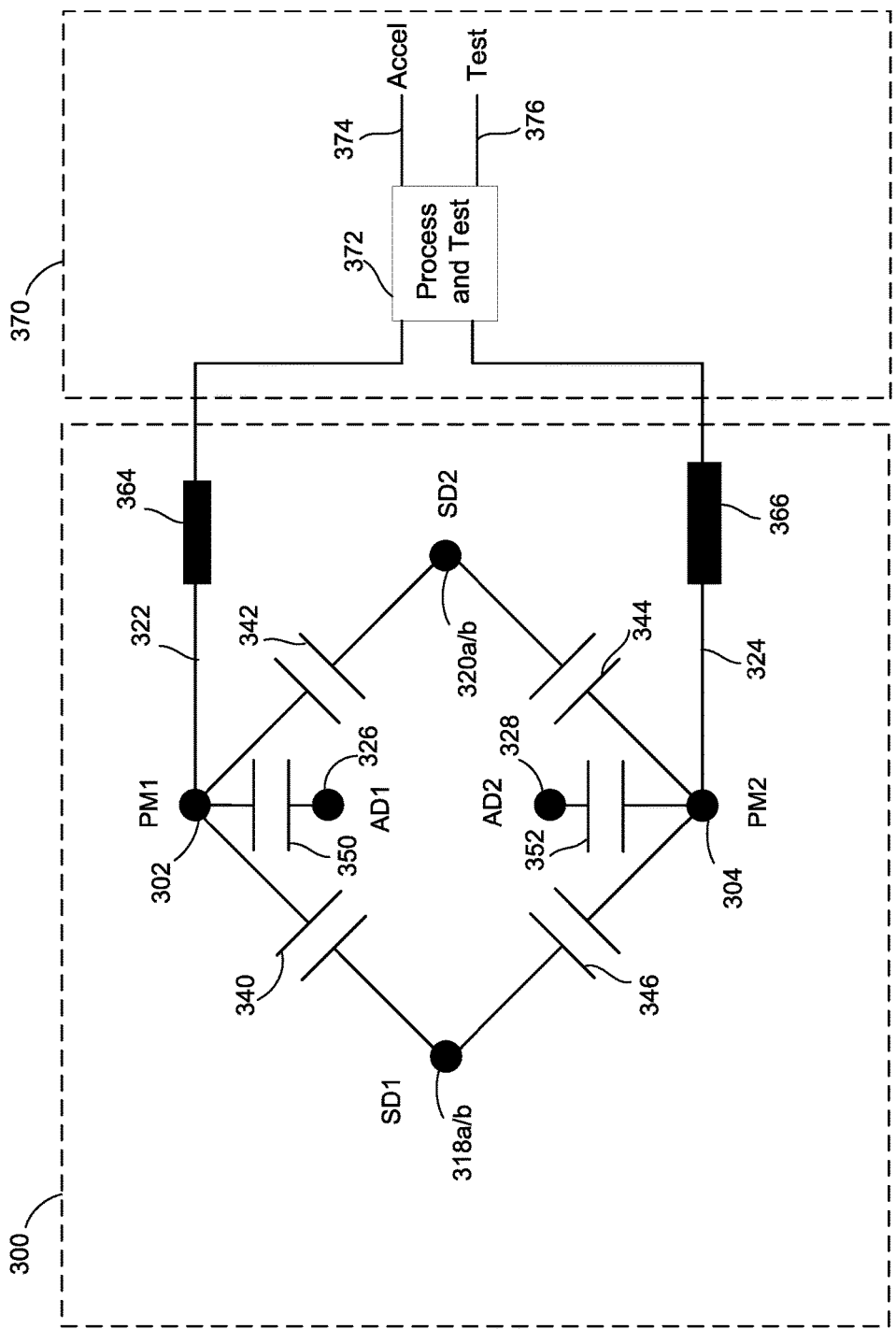
FIG. 3 shows an illustrative schematic diagram of the accelerometer of FIG. 2 in accordance with some embodiments of the present disclosure.

FIG. 3 provides an exemplary schematic depiction of the accelerometer of FIG. 2 coupled to processing circuitry in accordance with some embodiments of the present disclosure. In the schematic depiction of the FIG. 3, the numbering of the proof masses, sense electrodes, and auxiliary electrodes corresponds to the numbering FIG. 2, with these physical elements indicated by circular nodes in FIG. 3. Proof masses 202 and 204 correspond to the nodes 302 and 304, sense electrodes 218a and 218b correspond to node 318a/b, sense electrodes 220a and 220b correspond to node 320a/b, and auxiliary electrodes 226 and 228 correspond to nodes 326 and 328. As is depicted in FIG. 3, the sense electrodes 318a/b and 320a/b are each depicted as a single node, as each pair 318a/b and 320a/b provides a respective sense drive signal SD1 or SD2.

The capacitors formed by the proof masses and the sense electrodes are depicted as capacitor 340 (e.g., between proof mass 302 and sense electrode 318a), capacitor 342 (e.g., between proof mass 302 and sense electrode 320a), capacitor 344 (e.g., between proof mass 304 and sense electrode 320b), and capacitor 346 (e.g., between proof mass 304 and sense electrode 318b). The capacitors formed by the proof masses and the auxiliary electrodes are depicted as capacitor 350 (e.g., between proof mass 302 and auxiliary electrode 326) and capacitor 352 (e.g., between proof mass 304 and auxiliary electrode 328). In the embodiment of FIGS. 2 and 3, the capacitance of capacitors 340, 342, 344 and 346 will change in response to linear acceleration along the sense axis, while the capacitance of capacitors 350 and 352 should not change in response to linear acceleration along the sense axis.

Each of the capacitors may charge and discharge based on the capacitance of the capacitor and the signals that are applied to each of the capacitors (e.g. SD1, SD2, AD1, and AD2). These changes in charge include periodic components based on the frequencies of the applied signals. The changes are sensed at the proof masses 302 and 304, and provided to sense circuitry 370 (e.g., of processing circuitry 14) via sense path 322 and sense path 324 (e.g., corresponding to sense path 222 and sense path 224 in FIG. 2).

In some instances an error such as damage to one or more components may occur within one or both of the sense paths 322 and 324. The error may be manifested electrically as a change in an electrical characteristic of the sense path, such as a resistance, capacitance, inductance, or a combination thereof, and is depicted as errors 364 and 366. Any such error may result in errors in the measurement of acceleration, as the signals received from the accelerometer may be changed based on the changed electrical characteristics within the sense path. It may not be possible to identify or quantify the error based sense drive signals alone, since it may be unknown whether changes in the received signal at the sense drive frequency are the result of an error or to the movement of the proof masses relative to the sense electrodes (e.g., modifying the capacitance of the capacitors 340, 342, 344, and 346). In an exemplary embodiment described herein, the errors may be described as a change (e.g., an increase) in resistance that causes a reduction in a sensed signal, although it will be understood that any such reference may also refer to errors that are manifested as changes in other electrical characteristics, as described herein.

The received signals from the accelerometer 300 may be provided to the sense circuitry 370 via the sense paths 322 and 324. Although the sense circuitry may include a variety of suitable components, in an embodiment the sense circuitry may include processing and testing circuitry 372 coupled to the two sense paths 322 and 324 to measure the sensed acceleration (e.g., a capacitance to voltage conversion circuit) and to identify errors in the sense path based on a portion of the received signals that is attributable to the auxiliary drive signal. In other embodiments (not depicted in FIG. 3), separate circuitry may perform the processing to determine acceleration and the processing to identify errors, for example, by having separate differential amplifiers for each operation.

The processing and testing circuitry 372 may include conversion circuitry (e.g., capacitance to voltage conversion circuitry) that may convert the capacitance difference sensed from the proof masses to a sensed signal having a voltage, and in some embodiments, provide filtering (e.g., to emphasize a signal at the sense drive frequency). The sensed signal may be provided to additional processing and filtering circuitry which may be used to output a signal representative of acceleration (e.g., based on a portion of the sensed signal at the sense drive frequency) as well as test for errors (e.g., based on a portion of the sensed signal at the auxiliary drive frequency). In an embodiment, additional scaling and measurement circuitry (not depicted in FIG. 3) may apply scaling factors and filtering to the signal and provide a measured signal or measured value, such as an acceleration value or a signal representative of the acceleration. The result may be an acceleration output 374, which may be any suitable signal that may be used to determine acceleration (e.g. a portion of the sensed signal at the sense drive frequency, a signal that is directly proportional to the physical movement of the proof mass, etc.) or an acceleration measurement (e.g., an acceleration value).

In order to analyze the portion of the sensed signal at the auxiliary drive frequency, signal processing circuitry may emphasize a portion of the received signal that is associated with the auxiliary drive signal. As described herein, the auxiliary electrode that provides the auxiliary drive signal may be located such that the respective proof mass is static in response to linear acceleration along the sense axis. The processing circuitry for the auxiliary drive frequency portion of the sensed signal may identify an error 364 or 366 (e.g., as a resistance) in a respective sense path 322 or 324 based on the portion of the received signal that is associated with the auxiliary drive signal, and changes thereto (e.g., magnitude, frequency, phase, etc.) that may be caused by the errors. The error may be identified and information about the error may be provided (e.g., as notifications) from the processing circuitry 370 based on a comparison to thresholds, and in some embodiments, compensation may be performed based on the error (e.g., type of error, severity of error, etc.) and notifications regarding the compensation may be provided from the processing circuitry 370 as error output 376.

Figure 4:
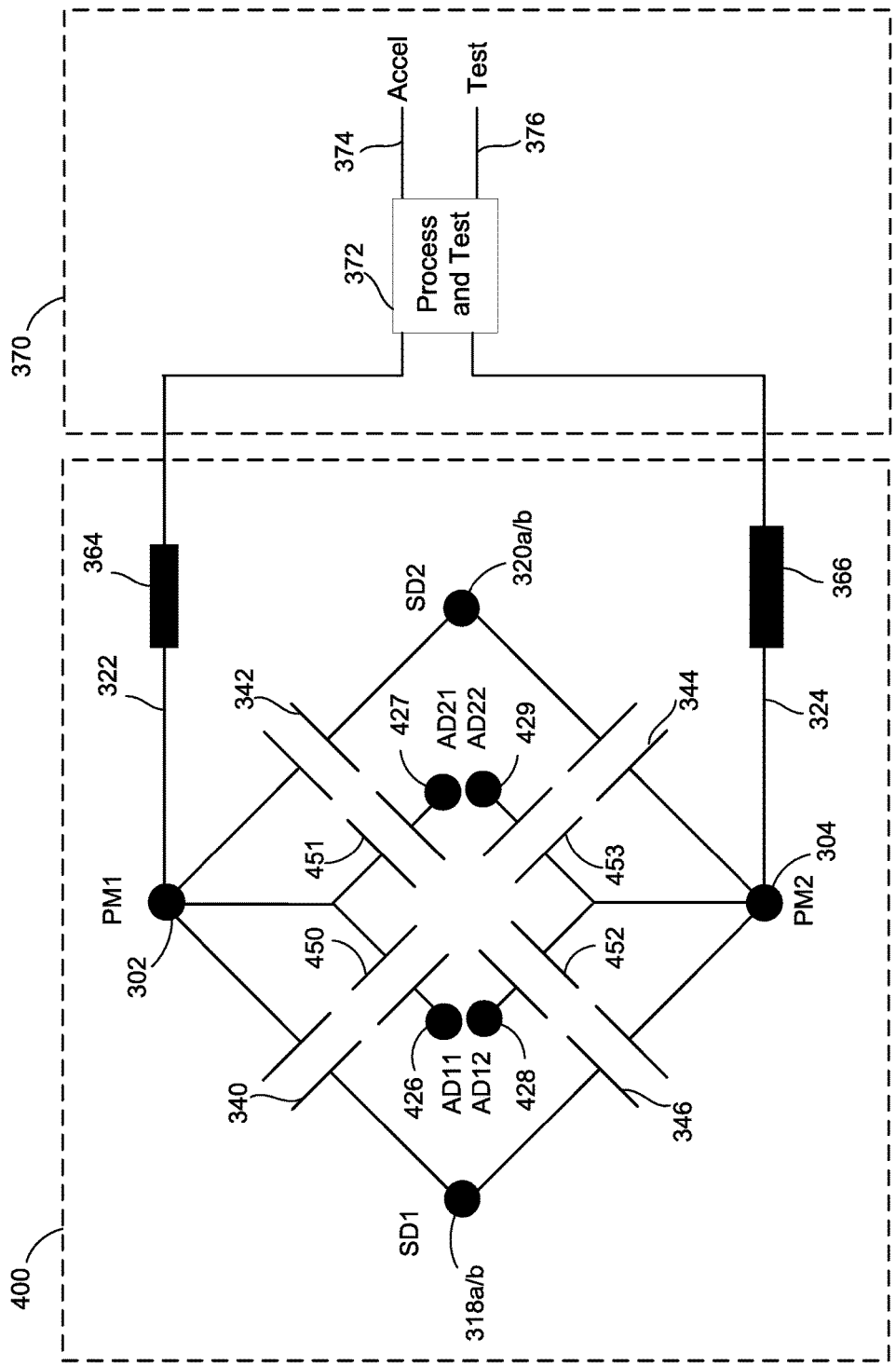
FIG. 4 shows an illustrative schematic diagram of an exemplary accelerometer having two pairs of auxiliary electrodes in accordance with some embodiments of the present disclosure.

FIG. 4 depicts an exemplary schematic depiction of another embodiment of an accelerometer including auxiliary electrodes and testing for errors in a sense path in accordance with some embodiments of the present disclosure. Although the accelerometer for FIG. 4 may include any suitable components, in an embodiment, many of the components of FIG. 4 may correspond to and function in a similar manner to the identically numbered components of FIG. 3.

In some embodiments, a plurality of auxiliary electrodes may be located relative to each proof mass such that each auxiliary electrode forms a capacitor with a proof mass (or in some embodiments, not depicted in FIGS. 3-4, a plurality of proof masses). The number of auxiliary electrodes may be modified for particular applications and may be provided in suitable multiples and in an even or odd number. Although the auxiliary electrodes may be located in a variety of locations with respect to the proof masses, in an embodiment some or all of the auxiliary electrodes may be located adjacent to an associated proof mass in a direction where the proof mass is static in response to linear acceleration along the sense axis, such that the capacitance of a capacitor formed therebetween does not change in response to the linear acceleration.

In the exemplary embodiment of FIG. 4, auxiliary electrode 426 may be located relative to proof mass 302 to form a capacitor 450, auxiliary electrode 427 may be located relative to proof mass 302 to form a capacitor 451, auxiliary electrode 428 may be located relative to proof mass 304 to form a capacitor 452, and auxiliary electrode 429 may be located relative to proof mass 304 to form a capacitor 453. An auxiliary drive signal having the auxiliary drive frequency may be applied to each of the auxiliary drive electrodes (e.g., auxiliary drive signal AD11 may be applied at auxiliary electrode 426, auxiliary drive signal AD21 may be applied at auxiliary electrode 427, auxiliary drive signal AD12 may be applied at auxiliary electrode 428, an auxiliary drive signal AD22 may be applied at auxiliary electrode 429). In embodiments, the auxiliary drive signal may be applied as a differential signal (e.g., with AD11 and AD21 having the same phase, AD11 and AD12 having the same phase, or AD11 and AD22 having the same phase) or as a common mode signal.

In some embodiments, one or more of the auxiliary electrodes may also be configured to provide other functionality, such as compensation or calibration. For example, in the embodiment of FIG. 4, each of the auxiliary electrodes may be associated with one of the sense electrodes (e.g., auxiliary electrode 426 may be associated with sense electrode 318*a*, auxiliary electrode 427 may be associated with sense electrode 320*a*, auxiliary electrode 428 may be associated with sense electrode 318*b*, and auxiliary electrode 429 may be associated with sense electrode 320*b*). Compensating or calibration signals may be provided via the auxiliary electrodes, e.g., during manufacturing, testing, operation, or in some embodiments, as compensation in response to the identification of an error in the sense path.

Figure 5:
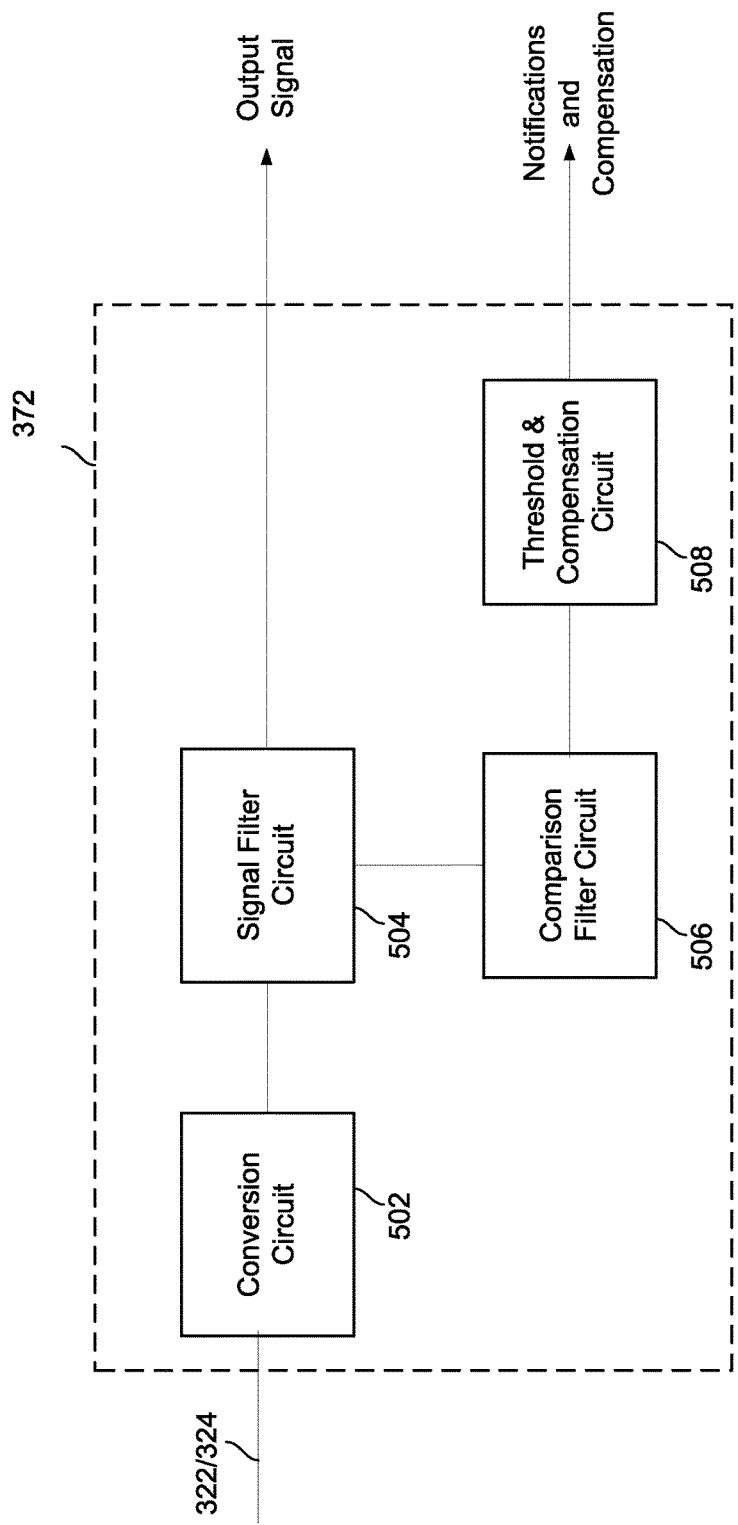
FIG. 5 shows an illustrative schematic diagram of auxiliary signal measurement circuitry in accordance with some embodiments of the present disclosure.

FIG. 5 shows an illustrative block diagram of processing and test circuitry 372 of processing circuitry 14 in accordance with some embodiments of the present disclosure. Although it will be understood that a variety of circuits may be employed for processing and test circuitry 372, that the functionality of the circuitry thereof may be modified, and that certain circuitry may be removed or reordered, in an embodiment the processing and test circuitry 372 may include a conversion circuit 502, signal filter circuit 504, comparison filter circuit 506, and threshold and compensation circuit 508.

Conversion circuit 502 of an auxiliary measurement circuit may receive a signal or signals from one or more of the sense paths, e.g., from a single sense path or to compare signals provided from a plurality of sense paths. In an embodiment of FIGS. 2-4, conversion circuit may receive a received signal from a both sense paths 322 and 324. In an embodiment, the received signal or signals may be received from the capacitors and the conversion circuit may perform a conversion into a voltage or current that is representative of the signals (e.g., magnitude, waveform, frequency, phase, etc.) at the capacitive plate of the sensed components (e.g., a proof mass). The output from the conversion circuit may be a converted signal.

In an embodiment, the converted signal may be provided from conversion circuit 502 to signal filter circuit 504. Signal filter circuit 504 may perform a variety of filtering functions, such as noise reduction, analog-to-digital conversion, emphasis of desired information (e.g., by high-pass, low-pass, or band-pass filtering), multiplication, decimation, or other desired filtering and signal processing operations. In an exemplary embodiment, signal filter circuit may perform filtering to output a signal representative of acceleration and also to provide a signal in the frequency range of the auxiliary drive signal. Noise filtering may be performed, and in some embodiments, the resulting signal may be digitized. In an embodiment, a signal representative of linear acceleration may be output as an output signal having electrical characteristics that change based on the movement of the proof mass. A signal including information at the auxiliary drive frequency may also be provided to additional circuitry such as comparison filter circuit 506, and may be the output signal or an intermediate signal determined during the processing of the signal filter circuit.

Comparison filter circuit 506 may include filtering and signal processing to provide an output signal that may be used for a determination as to whether there is an error within the proof mass or sense path. Although comparison filter circuit 506 may perform a variety of filtering functions (e.g., such as noise reduction, analog-to-digital conversion, emphasis of desired information (e.g., by high-pass, low-pass, or band-pass filtering), multiplication, decimation, or other desired filtering and signal processing operations), in an embodiment the comparison filter circuit may output a value that is representative of the error within the proof mass and sense path. In an embodiment, comparison filter circuit may remove the frequency content at the auxiliary drive frequency. The resulting output signal or signals representative of the error (e.g., an error signal) may be provided to threshold and compensation circuit 508.

Threshold and compensation circuit 508 may receive the signal or signals representative of the error (e.g., an error signal) and may perform a variety of functions based on the received signal or signals. Example operations may include determining whether the error exceeds one or more thresholds, and based on those thresholds and other information, whether the operation of the accelerometer should be stopped, whether a failure should be indicated, whether compensation should be performed at the accelerometer, whether compensation should be performed based on other information (e.g., from other sensors), and the degree and type of compensation to be performed. In an embodiment, the error information may be compared with linear acceleration measurements to determine the notifications and compensation requirements, for example, based on common trends that may be identified from the error and linear acceleration measurements. In some embodiments, the determinations may be performed based on historical information relating to the operation and error measurements of the accelerometer, and/or a rate of change of linear acceleration and/or error measurements. In some embodiments, comparison information may be transmitted to external processing circuitry, device processors, or remote systems for analysis (e.g., based on data collected and updated over time based on known information about a plurality of errors at a plurality of accelerometers).

Figure 6:
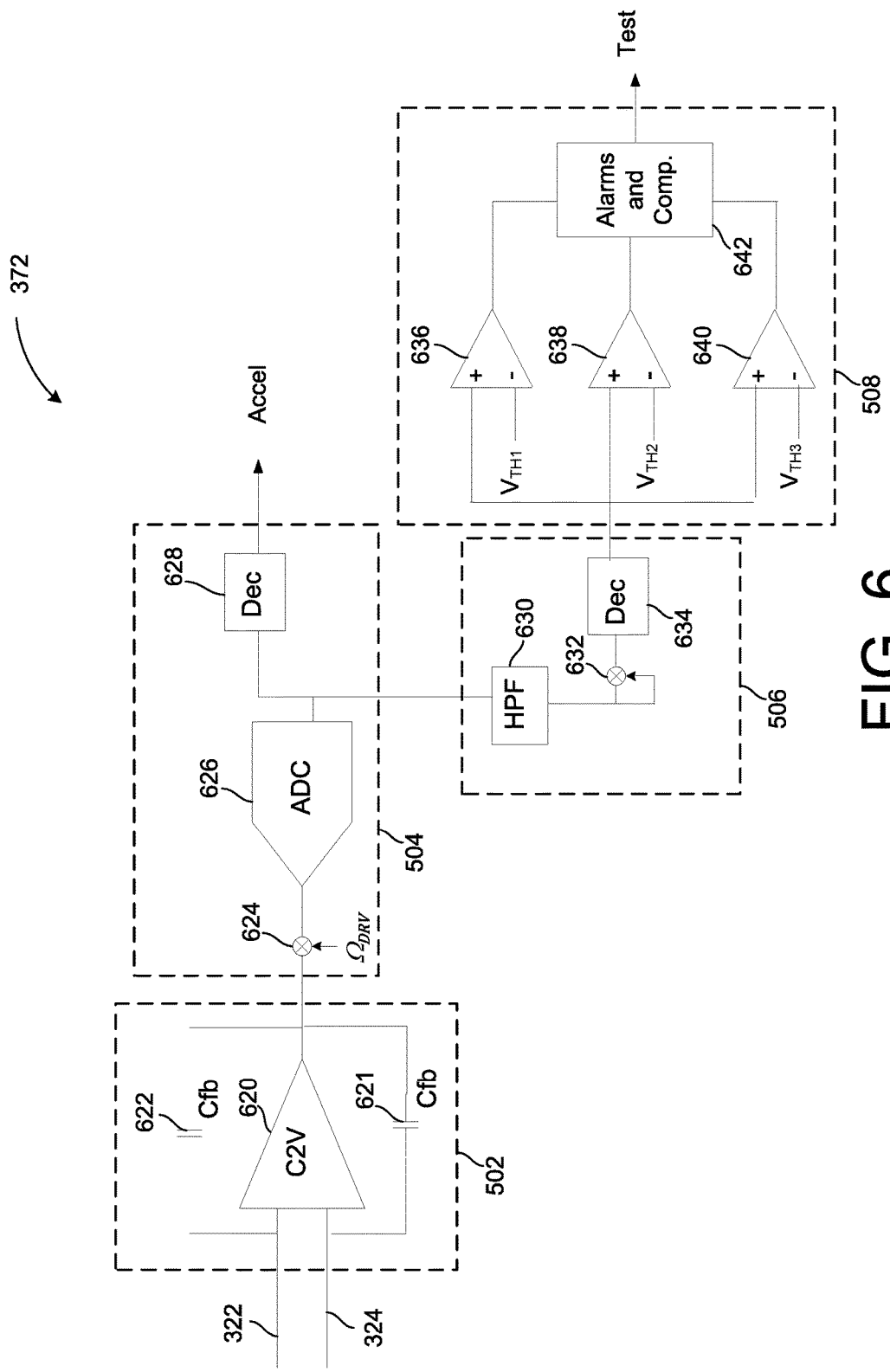
FIG. 6 shows an illustrative circuit diagram of auxiliary signal measurement circuitry in accordance with some embodiments of the present disclosure.

FIG. 6 shows an illustrative circuit diagram of processing and test circuitry in accordance with some embodiments of the present disclosure. In an embodiment, the circuit diagram may depict components of the conversion circuit 502, signal filter circuit 504, comparison filter circuit 506, and threshold and compensation circuit 508, although it will be understood that in other embodiments other circuits may be employed, the components depicted may be rearranged, one or more components may be added or removed, and one or more of the components may be replaced by other components performing similar functionality.

In an exemplary embodiment of conversion circuit 502, a signal from each of the sense paths 322 and 324 may be received at respective input nodes of a component such as a capacitance to voltage converter (C2V) 620, and in an embodiment. A feedback capacitor 622 may be coupled to the output of C2V 620 and to the first input node, and a feedback capacitor 621 may be coupled to the output of C2V 620 and to the second node. The output of C2V 620 may be a converted signal having a voltage that corresponds to the differential capacitances at the proof masses associated with the sense paths.

In an exemplary embodiment of signal filter circuit 504, the converted signal that is output from C2V 620 may be processed in order to reduce signal content at the sense drive frequency $\Omega_{DRV}$. In an embodiment, the received converted signal may be mixed by mixer 624 with a periodic signal at the sense drive frequency, thus shifting the converted signal by the sense drive frequency, resulting in the frequency of a portion of the original converted signal that was associated with the auxiliary drive signal being shifted by this amount. For example, in an embodiment where the auxiliary drive frequency $\Omega_{AUX}=32*\Omega_{DRV}/21$, the resulting signal content from the auxiliary frequency will have a frequency $\Omega_{AUX\_MIX}=11\Omega_{AUX}/21$. The output from the mixer may be provided to analog-to-digital converter 626, and the resulting digital output signal may be provided to decimator 628 of signal filter circuit 504 and to comparison filter circuit 506. Decimator 628 may reduce the sampling rate of the digital signal from the analog-to-digital converter 628, and output a signal that is representative of the movement of the proof masses relative to the sense electrodes in its base band. Although not depicted in FIG. 6, this acceleration output may then be provided to additional circuitry (e.g., gain stages) for further processing to determine linear acceleration.

In an exemplary embodiment of comparison filter circuit 506, the digital signal that is output from the analog-to-digital converter may be received by a high-pass filter 630, which may have a cut-off frequency that passes frequencies that are associated with the processed auxiliary drive signal (e.g., as modified by mixer 624) while removing lower frequency content. Although a high-pass filter 630 is depicted in FIG. 6, it will be understood that a band-pass filter may be provided in some embodiments (e.g., based on expected harmonic or other content), or in an embodiment where the auxiliary drive frequency is less than the sense drive frequency, a low-pass filter may be employed. The resulting signal may be mixed with itself at mixer 632, thus shifting the frequency such that a signal having the magnitude of the response to the auxiliary drive signal is output from mixer 632 to decimator 634. Decimator 634 may reduce the sampling rate of the output signal from mixer 632, and provide down-sampled comparison signal to threshold and compensation circuit 508.

In an exemplary embodiment of threshold and compensation circuit 508, the comparison signal may be compared to one or more thresholds. As described herein, the signal that results from the auxiliary drive signal due to the processing of comparison filter circuit 506 (e.g., the comparison signal) may change based on an error. The error may be sensed based on how a value associated with the comparison signal (e.g., magnitude, phase, frequency) compares to threshold values. Although suitable values and thresholds may be compared in a variety of manners, in an exemplary embodiment the error may correspond to a resistance, such that an increase in the resistance results in a reduction in the magnitude of the comparison signal.

In an embodiment, a plurality of comparisons may be performed for a plurality of thresholds, such that different signal levels for the comparison circuit may result in different responses or notifications. In an exemplary embodiment, three thresholds ($V_{TH1}$, $V_{TH2}$, and $V_{TH3}$) may be utilized for comparison, with each threshold corresponding to a different possible error level. Although the comparison may be performed in a variety of manners, in an embodiment each of the thresholds may correspond to an analog voltage that is input to a comparator 636, 638, or 640, with the comparison signal being compared to each of the thresholds. In an embodiment where a reduction in the magnitude of the comparison signal corresponds to a greater degree of a sensed error (e.g., resistance), threshold $V_{TH1}$ may be greater than threshold $V_{TH2}$, which may be greater than threshold $V_{TH3}$. A comparison voltage greater than $V_{TH1}$ may correspond to a normal operating condition, in which a high signal is output from each of the comparators 636, 638, and 640. A comparison voltage less than $V_{TH1}$ and greater than $V_{TH2}$ may indicate a first error condition, in which a low signal is output from $V_{TH1}$ and a high signal is output from $V_{TH2}$ and $V_{TH3}$. A comparison voltage less than $V_{TH2}$ and greater than $V_{TH3}$ may indicate a second error condition that is more severe than the first error condition, in which a low signal is output from $V_{TH1}$ and $V_{TH2}$ and a high signal is output from $V_{TH3}$. Finally, a comparison voltage less than $V_{TH3}$ may indicate a third error condition at a highest severity level, in which a low signal is output from all of $V_{TH1}$, $V_{TH2}$ and $V_{TH3}$.

In an embodiment, the outputs from the comparators may be provided to alarm and compensation circuit 642. The alarm and compensation circuit may be programmable, such that different actions may be taken based on different error conditions. Exemplary actions include providing notifications, generating alarms, ceasing the operation of the accelerometer, modifying operational parameters of the accelerometer, modifying gain values that are applied to the acceleration output signal, modifying output data from the accelerometer (e.g., based on scaling factors or data from other sensors), other suitable operations, and any suitable combination thereof.

In an exemplary embodiment, under normal operating conditions (e.g., all three comparator outputs high) the accelerometer may continue to operate normally and no notifications may be provided (e.g. other than a notification of normal operation). In the case of a first error condition (e.g., a low output from comparator 636 and a high output from comparators 638 and 640), a warning notification of the existence of an error may be provided and the output data from the accelerometer may be modified to adjust for the error (e.g., a first type of compensation). In the case of a second error condition (e.g., a low output from comparator 636 and comparator 638, and a high output from comparator 640), a warning notification of the existence of an error may be provided and operational parameters (e.g., modifications to sense drive signals, application of signals to compensation electrodes, etc.) may be performed in an attempt to compensate for the error (e.g., a second type of compensation). In an embodiment, modification of output values may also be performed in response to the second error condition. In the case of the third error condition, it may be determined that the accelerometer should cease to operate, and a notification may be provided that causes the shutdown of the accelerometer.

In some embodiments, the alarm and compensation circuit may retain a memory of previous error conditions and responses, such that different compensation techniques may be performed based on the efficacy of the technique, and may be combined based on particular compensation that is presently being performed. For example, if a modification to an operational parameter successfully caused the accelerometer to move from the second error condition to the normal condition or the first error condition, the modification to the operational parameter may be maintained. In another example, different modifications of output data may correspond to different changes in operational parameters, and may be employed based upon the change in operational parameters that is used to remedy an error.

Figure 7:
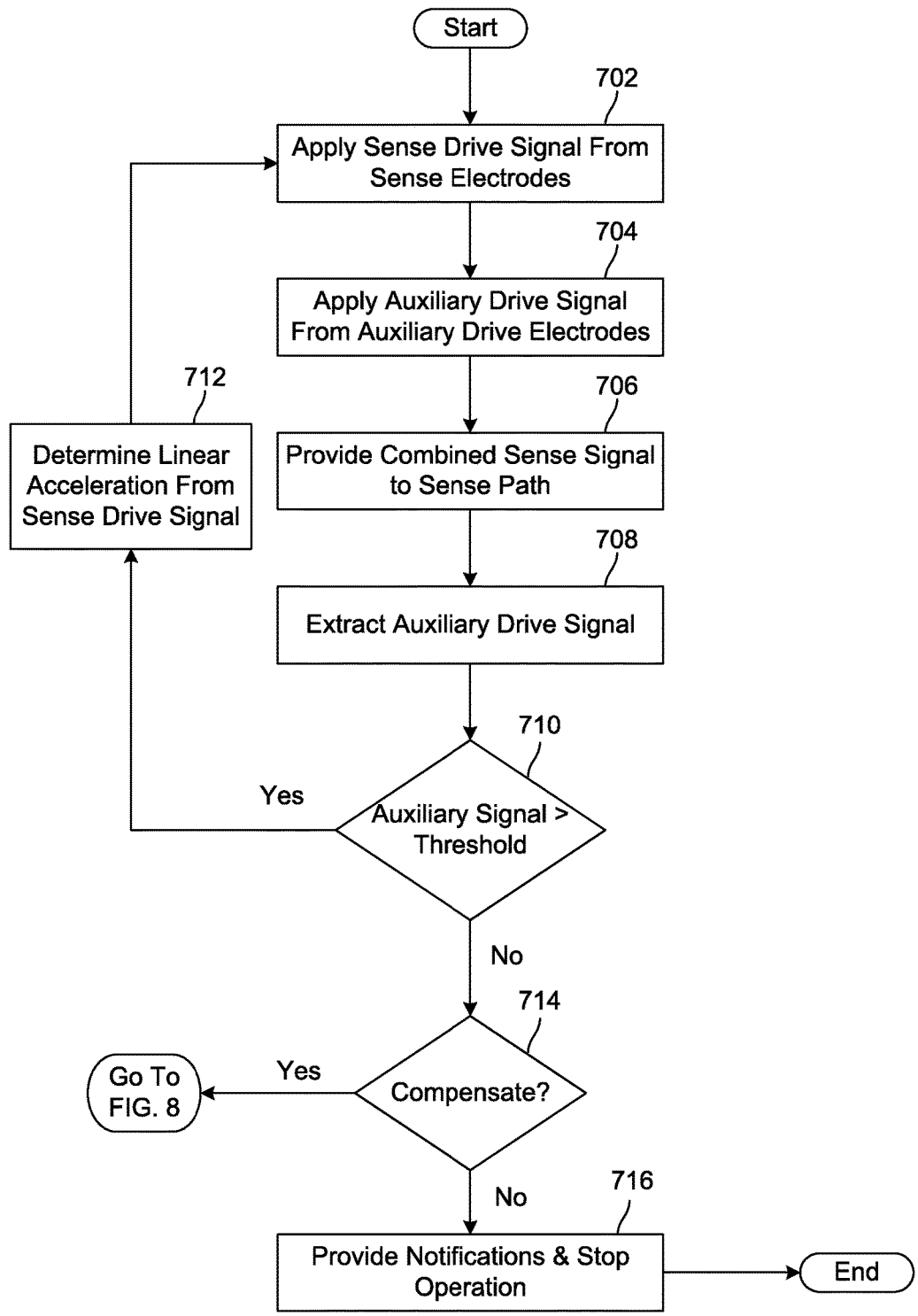
FIG. 7 shows exemplary steps for determining whether an error is present in the sense path of the accelerometer in accordance with some embodiments of the present disclosure.
Figure 8:
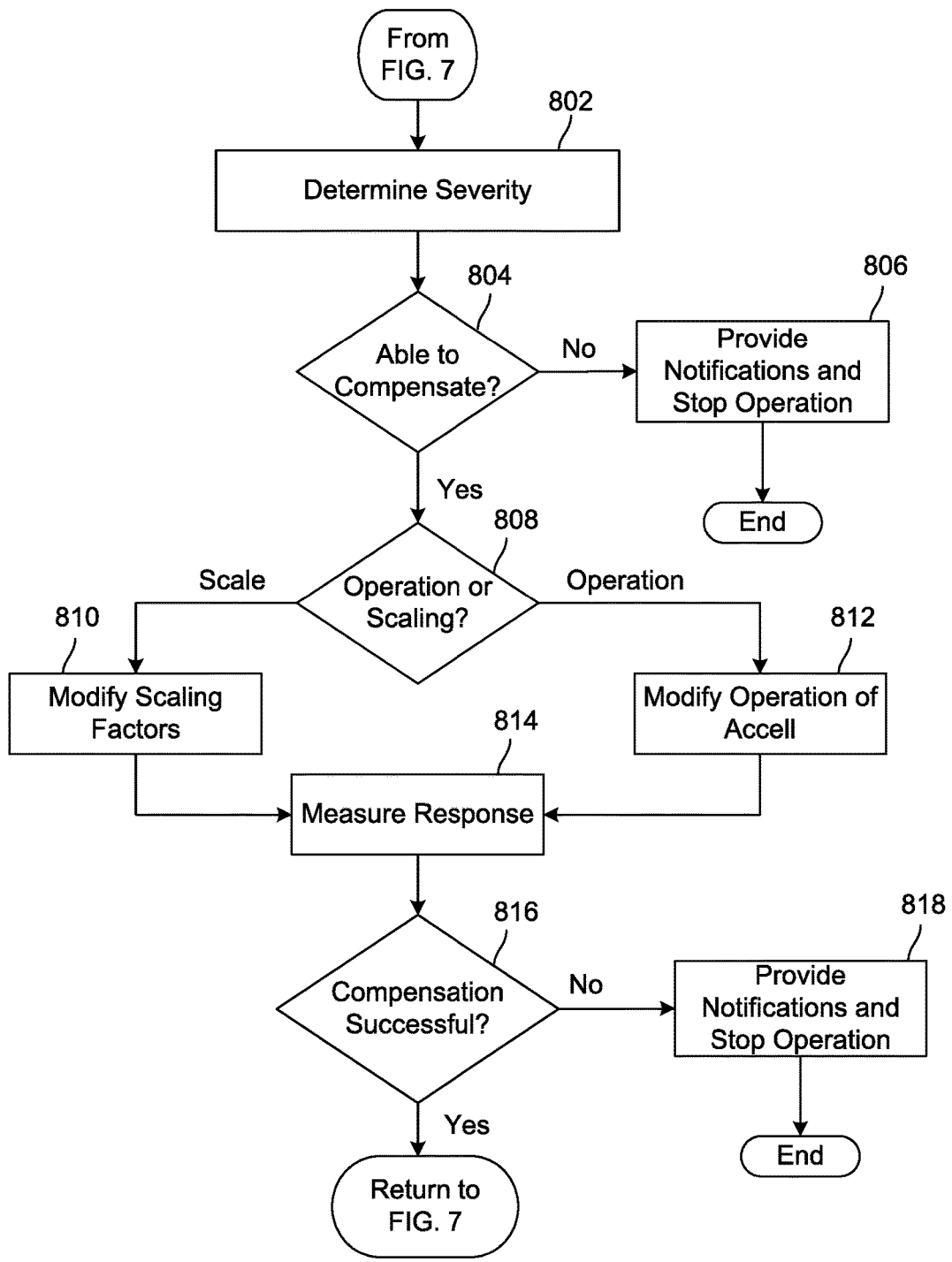
FIG. 8 shows exemplary steps for compensating for an error that is present in the sense path of the accelerometer in accordance with some embodiments of the present disclosure.

FIGS. 7-8 depict exemplary steps for identifying errors within a sense path according to some embodiments of the present disclosure. Although FIGS. 7-8 are described in the context of the present disclosure, it will be understood that the methods and steps described in FIGS. 7-8 may be applied to a variety of sensor and accelerometer designs, signal paths, errors, and compensation techniques. Although a particular order and flow of steps is depicted in FIGS. 7-8, it will be understood that in some embodiments one or more of the steps may be modified, moved, removed, or added, and that the flow depicted in FIGS. 7-8 may be modified.

FIG. 7 depicts exemplary steps for determining whether an error is present in a sense path of an accelerometer in accordance with some embodiments of the present disclosure. As described herein, an exemplary accelerometer may include both sense electrodes and auxiliary electrodes positioned relative to one or more proof masses such that the proof masses form capacitors with the sense electrodes and auxiliary electrodes.

At step 702, a sense drive signal may be applied to the sense electrodes. The sense drive signal may have a sense drive frequency, and in some embodiments, may be provided as a differential signal to different ones of the sense electrodes. Once the sense drive signal has been applied to the sense electrodes, processing may continue to step 704.

At step 704, an auxiliary drive signal may be applied to the auxiliary electrodes. The auxiliary drive signal may have an auxiliary drive frequency, and in some embodiments, may be provided as a differential signal to different ones of the auxiliary electrodes. Once the auxiliary drive signal has been applied to the auxiliary electrodes, processing may continue to step 706.

At step 706, a combined signal that is responsive to the sense drive signal and the auxiliary drive signal may be received via sense paths, for example, via one or more proof masses that form a capacitor with sense drive electrodes and auxiliary electrodes. The combined signal may be received at processing circuitry via the sense paths. The processing circuitry may process the received combined signal to determine information about acceleration, to identify errors such as a resistance within the sense path, provide notifications, perform compensation, and perform other operations as described herein. Once the combined signal is received, processing may continue to step 708.

At step 708, a portion of the received signal that corresponds to the response of the sense path to the auxiliary drive signal may be extracted from the combined received signal. In some embodiments, the content of the signal may be extracted by reducing signal content corresponding to the sense drive frequency, based on the auxiliary drive frequency and the sense drive frequency having different frequencies at which an initial subset of harmonics for the two signals do not overlap. In an embodiment, the output of the extraction may be a comparison signal having an analog voltage representative of the magnitude of the auxiliary drive signal, reduced by losses that occur within the sense path. Once the portion of the received signal is extracted at step 708, processing may continue to step 710.

At step 710, the comparison signal may be compared to one or more thresholds. In exemplary embodiment as described herein, the voltage of the comparison signal may be reduced based on the severity of the error (e.g., an increase in resistance within the sense path), such that a lower voltage corresponds to a more severe error. In an exemplary embodiment of multiple thresholds, the processing may continue to step 712 if all of the thresholds are exceeded, or in some embodiments, if only a warning threshold is exceeded. At step 712, acceleration may be determined based on a response to the sense drive signal, and processing may return to step 702. If the auxiliary signal is less than the threshold or thresholds, or in some embodiments, is less than a threshold associated with a requirement to stop operation or to compensate for operation, processing may continue to step 714.

At step 714, the processing circuitry may determine whether compensation may be performed in response to the error, or whether the accelerometer should cease operation in response to the error. If compensation may be performed, processing may continue to the processing described in FIG. 8. If compensation may not be performed, processing may continue to step 716, where notifications may be provided and the accelerometer may cease operating (e.g., voltage may be removed from some or all components of the accelerometer, the sense drive signal may no longer be provided, etc. The processing of FIG. 7 may then end.

FIG. 8 shows exemplary steps for compensating for an error is present in the sense path of the accelerometer in accordance with some embodiments of the present disclosure. The processing of FIG. 8 may be performed if an error has been identified in the steps of FIG. 7 (e.g., due to the voltage of the comparison signal falling below one or more threshold voltages) and if compensation for errors is allowed within the particular accelerometer.

At step 802, the severity of the error may be determined, e.g., based on the value for the voltage for the comparison signal. In an embodiment, the severity may be based on comparison of the comparison signal to a plurality of thresholds (e.g., at a plurality of comparators) in order to identify one of a plurality of error conditions. In an embodiment, one or more of the error conditions may be associated with a severity, either alone or considered in concert with other available information (e.g., compensation or acceleration data history, simultaneous acceleration data, etc.). Once the severity is determined, processing may continue to step 804.

At step 804, it may be determined whether compensation is possible based on the severity of the error. In an embodiment, one or more error conditions or severity levels may be associated with different error responses. If the error condition or severity level does not permit compensation, processing may continue to step 806, where notifications may be provided and the accelerometer may cease operating (e.g., voltage may be removed from some or all components of the accelerometer, the sense drive signal may no longer be provided, etc.). The processing of FIG. 8 may then end. If compensation is possible, processing may continue to step 808.

At step 808, it may be determined what type of compensation is possible based on the severity of the error. Although a variety of suitable types of compensation may be possible, in an embodiment the types of compensation may involve modification of the output data from the accelerometer (e.g., by modifying scaling factors) or modification of operational parameters of the accelerometer (e.g., by modifying a sense drive signal or providing compensating signals to compensation electrodes). Different severity levels may be associated with different compensation types, and in some embodiments, different compensation techniques within the different types. In some embodiments, additional information such as historical compensation information or accelerometer data, or current accelerometer data, may be considered when determining a compensation type. If the compensation type requires only modification of scaling factors, processing may continue to step 810. If the compensation requires modifying operational parameters of the accelerometer, processing may continue to step 812.

At step 810, the compensation scaling technique may be selected and the degree of compensation may be determined, based on the severity of the error, and in some embodiments, other information such as historical compensation information or accelerometer data, or current accelerometer data. Scaling may be updated in a variety of manners, such as adjusting amplification values associated with hardware or adjusting scaling factors in software. Once the scaling modification has been completed, processing may continue to step 814.

At step 812, the technique for modifying the operational parameters of the accelerometer may be selected and the degree of compensation may be determined, based on the severity of the error, and in some embodiments, other information such as historical compensation information or accelerometer data, or current accelerometer data. Operational parameters may be modified in a number of manners, such as by modifying characteristics of the sense drive signal or applying compensating signals at compensation electrodes. Once the operational parameter modification has been completed, processing may continue to step 814.

At step 814, the response to the compensation may be measured. In an embodiment in which a scaling factor is modified, a change such as a change in acceleration output values or other signal values impacted by the scaling may be measured. In an embodiment of modification of operational parameters, changes in responses to the sense drive signal and/or auxiliary drive signal may be determined. Once the response has been measured at step 814, processing may continue to step 816.

At step 816, it may be determined whether the compensation has been successful. In an exemplary embodiment, the measured response values at step 814 may be compared to expected measured response values based on the compensation. If the measured response values correspond to expected values (e.g., within a threshold window), the processing may return to step 702 of FIG. 7. If the measured response values do not correspond to expected values (e.g., within a threshold window), processing may continue to step 818, where notifications may be provided (e.g., that compensation failed) and the accelerometer may cease operating (e.g., voltage may be removed from some or all components of the accelerometer, the sense drive signal may no longer be provided, etc.). The processing of FIG. 8 may then end.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A system, comprising:
   at least two sense electrodes, wherein a sense drive signal having a sense drive frequency is applied to each of the sense electrodes;
   a first auxiliary electrode, wherein a first auxiliary drive signal having an auxiliary drive frequency is applied to the first auxiliary electrode;
   a second auxiliary electrode, wherein a second auxiliary drive signal having the auxiliary drive frequency is applied to the second auxiliary electrode;
   a first proof mass, wherein the first proof mass is located adjacent to one or more of the at least two sense electrodes and adjacent to the first auxiliary electrode;
   a second proof mass, wherein the second proof mass is located adjacent to one or more of the at least two sense electrodes and adjacent to the second auxiliary electrode; and
   processing circuitry coupled to each of the first proof mass and the second proof mass to provide a received signal from the first proof mass and the second proof mass, wherein the processing circuitry determines linear acceleration based on a portion of the received signal associated with the sense drive frequency, and identifies a failure based on a portion of the received signal associated with the auxiliary drive frequency,
   wherein the processing circuitry is configured to generate a measurement signal based on the received signal and comprises an auxiliary signal measurement circuit coupled to receive the measurement signal, and wherein the failure is identified based on the measurement signal, and wherein the auxiliary signal measurement circuit further comprises a mixer and a decimator, wherein the mixer is configured to receive a portion of the measurement signal at a plurality of inputs, wherein the decimator is coupled to the output of the mixer to reduce a frequency of a signal received from the mixer, and wherein the failure is identified based on a voltage level of the output of the decimator.

2. The system of claim 1, wherein the first auxiliary electrode is located adjacent to a portion of the first proof mass that is static in response to the determined linear acceleration, and wherein the second auxiliary electrode is located adjacent to a portion of the second proof mass that is static in response to the determined linear acceleration.

3. The system of claim 1, wherein the first auxiliary drive signal and the second auxiliary drive signal are differential signals.

4. The system of claim 1, wherein the first auxiliary drive signal and the second auxiliary drive signal are common mode signals.

5. The system of claim 1, wherein the auxiliary drive frequency is greater than the sense drive frequency.

6. The system of claim 1, wherein the auxiliary drive frequency is less than the sense drive frequency.

7. The system of claim 1, wherein none of first four harmonics of the auxiliary drive frequency are within 5% of any of the first four harmonics of the sense drive frequency.

8. The system of claim 1, wherein the auxiliary signal measurement circuit comprises a filter, wherein the filter separates a portion of the measurement signal that is associated with the auxiliary drive frequency, and wherein the failure is identified based on the portion of the measurement signal.

9. The system of claim 1, wherein the failure is identified based on a comparison of the voltage level of the output of the decimator to a threshold voltage.

10. The system of claim 9, wherein the failure is identified when the voltage level of the output of the decimator is less than the threshold voltage.

11. The system of claim 1, wherein the linear acceleration is determined based on the measurement signal.

12. The system of claim 1, wherein the failure is associated with a resistance located between one of the first proof mass and the processing circuitry or the second proof mass and the and the processing circuitry.

13. The system of claim 1, wherein the failure is identified based on the magnitude of the portion of the received signal associated with the auxiliary drive frequency falling below a threshold value.

14. The system of claim 1, further comprising providing a notification based on the identification of the failure.

15. The system of claim 1, wherein the at least two sense electrodes comprise at least two first sense electrodes and at least two second sense electrodes, wherein one of the at least two first sense electrodes and one of the at least two second sense electrodes are each located adjacent to the first proof mass to sense movement of the first proof mass in response to linear acceleration, and wherein another of the at least two first sense electrodes and another of the at least two second sense electrodes are each located adjacent to the second proof mass to sense movement of the second proof mass in response to linear acceleration.

16. The system of claim 15, wherein a first sense drive signal having the sense drive frequency is applied to the first sense electrodes and wherein a second sense drive signal having the sense drive frequency is applied to the second sense electrodes, and wherein the first sense drive signal and the second sense drive signal have a different phase.

17. A method implemented by the system according to claim 1, comprising:
providing, to the at least two sense electrodes, a sense drive signal having a sense drive frequency;
providing, to the first auxiliary electrode, a first auxiliary drive signal having an auxiliary drive frequency;
providing, to the second auxiliary electrode, a second auxiliary drive signal having the auxiliary drive frequency;
receiving, from the first proof mass located adjacent to one or more of the at least two sense electrodes and adjacent to the first auxiliary electrode, a first proof mass signal;
receiving, from the second proof mass located adjacent to one or more of the at least two sense electrodes and adjacent to the second auxiliary electrode, a second proof mass signal;
generating the received signal based on the first proof mass signal and the second proof mass signal;
determining linear acceleration based on a portion of the received signal associated with the sense drive frequency; and
identifying the failure based on a portion of the received signal associated with the auxiliary drive frequency.

18. A suspended spring-mass system, comprising:
a proof mass suspended by one or more springs to move in response to a linear acceleration along a first axis;
a sense electrode located adjacent to the proof mass such that a capacitor formed by the proof mass and the sense electrode changes in response to the linear acceleration along the first axis;
an auxiliary electrode located adjacent to the proof mass such that a capacitor formed by the proof mass and the auxiliary electrode does not change in response to the linear acceleration along the first axis;
processing circuitry coupled to each of the proof mass, the sense electrode, and the drive electrode, wherein the processing circuitry provides a sense drive signal having a sense drive frequency to the sense electrode and an auxiliary drive signal having an auxiliary drive frequency to the auxiliary electrode, and wherein the processing circuitry receives a received signal from the proof mass, determines linear acceleration based on a portion of the received signal associated with the sense drive frequency, and identifies a failure based on a portion of the received signal associated with the auxiliary drive frequency,
wherein the processing circuitry is configured to generate a measurement signal based on the received signal and comprises an auxiliary signal measurement circuit coupled to receive the measurement signal, and wherein the failure is identified based on the measurement signal, and
wherein the auxiliary signal measurement circuit further comprises a mixer and a decimator, wherein the mixer is configured to receive a portion of the measurement signal at a plurality of inputs, wherein the decimator is coupled to the output of the mixer to reduce a frequency of a signal received from the mixer, and wherein the failure is identified based on a voltage level of the output of the decimator.

* * * * *